(12) United States Patent
Baxter et al.

(10) Patent No.: US 11,659,827 B2
(45) Date of Patent: May 30, 2023

(54) BOOM ROLL LINKAGE

(71) Applicant: Deere & Company, Moline, IL (US)

(72) Inventors: Garry E. Baxter, Ankeny, IA (US);
Bradley J. Hitchler, Baxter, IA (US)

(73) Assignee: Deere & Company, Moline, IL (US)

( * ) Notice: Subject to any disclaimer, the term of this patent is extended or adjusted under 35 U.S.C. 154(b) by 152 days.

(21) Appl. No.: 16/519,991

(22) Filed: Jul. 23, 2019

(65) Prior Publication Data

US 2021/0022331 A1 Jan. 28, 2021

(51) Int. Cl.
*A01M 7/00* (2006.01)

(52) U.S. Cl.
CPC ........ *A01M 7/0057* (2013.01); *A01M 7/0071* (2013.01)

(58) Field of Classification Search
CPC .......................... A01M 7/0057; A01M 7/0071
USPC ........................................................ 239/159
See application file for complete search history.

(56) References Cited

U.S. PATENT DOCUMENTS

| 6,234,407 | B1 | 5/2001 | Knight et al. |
| 6,776,356 | B2 | 8/2004 | Maliteare |
| 6,834,223 | B2 * | 12/2004 | Strelioff .............. A01M 7/0057 239/167 |
| 7,249,448 | B2 | 7/2007 | Murphy et al. |
| 2016/0255769 | A1 | 9/2016 | Leeb |
| 2016/0286780 | A1 | 10/2016 | Leeb et al. |
| 2017/0164599 | A1 | 6/2017 | Ito et al. |

FOREIGN PATENT DOCUMENTS

| DE | 202007011631 U1 | 10/2007 | |
| EP | 3501275 A1 * | 6/2019 | .......... A01M 7/0057 |
| EP | 3501275 A1 | 6/2019 | |
| FR | 2816805 A1 | 9/2003 | |

OTHER PUBLICATIONS

European Search Report issued in counterpart application No. 20185713.3 dated Dec. 15, 2020 (08 pages).

* cited by examiner

*Primary Examiner* — Cody J Lieuwen
(74) *Attorney, Agent, or Firm* — Tucker Ellis LLP

(57) ABSTRACT

One or more techniques and/or systems are disclosed for a boom suspension system that mitigates roll of respective booms as an associated vehicle rolls from side to side. The exemplary system can comprise a stabilizer bar that couples a left boom to a right boom, by coupling to respective booms' tilt cylinders. The stabilizer bar can be engaged with a central frame, which is fixedly engaged with the vehicle's chassis, through a stabilizer link. The stabilizer link allows the stabilizer bar to move horizontally left and right independently of the left and right movement of the central frame, caused by the vehicle roll. In this way, the inertia of the respective booms allows the stabilizer bar to remain in a substantially neutral position while the central frame, and vehicle, roll from side to side.

20 Claims, 6 Drawing Sheets

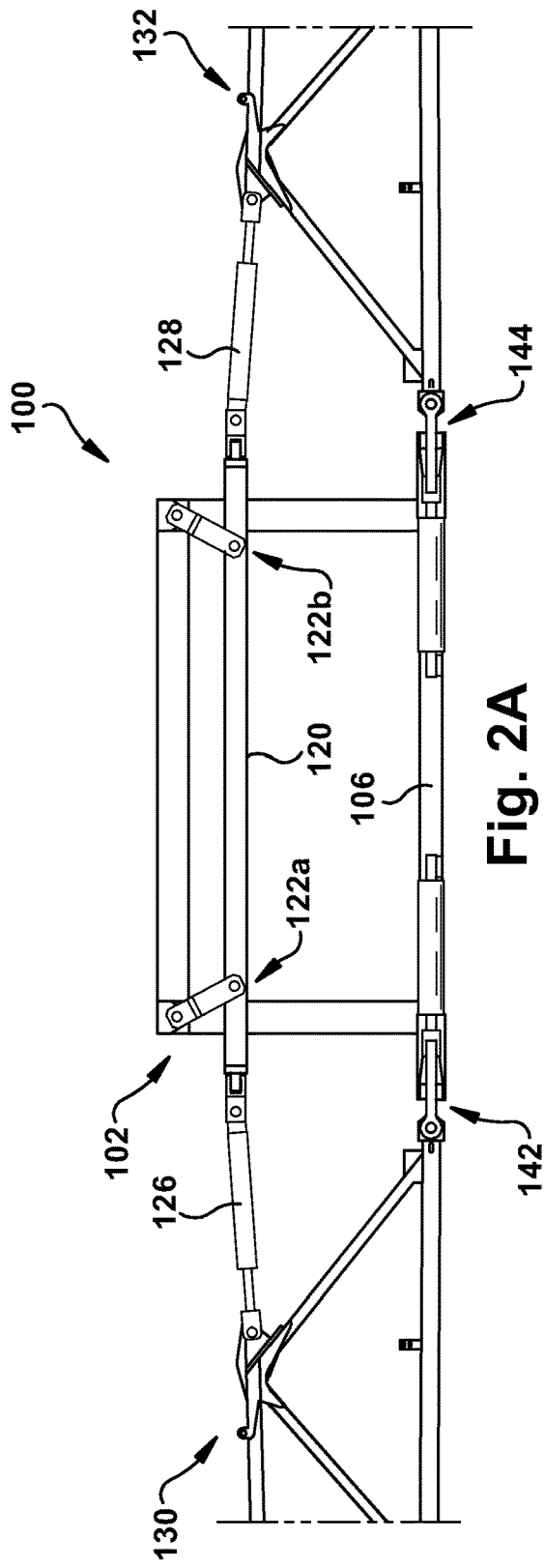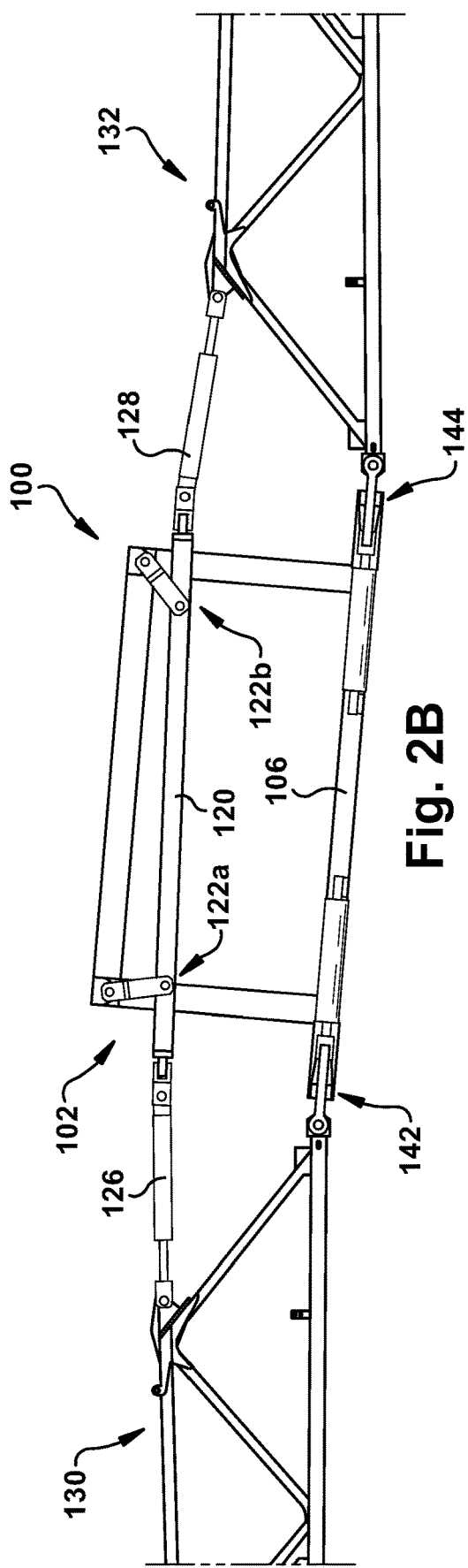

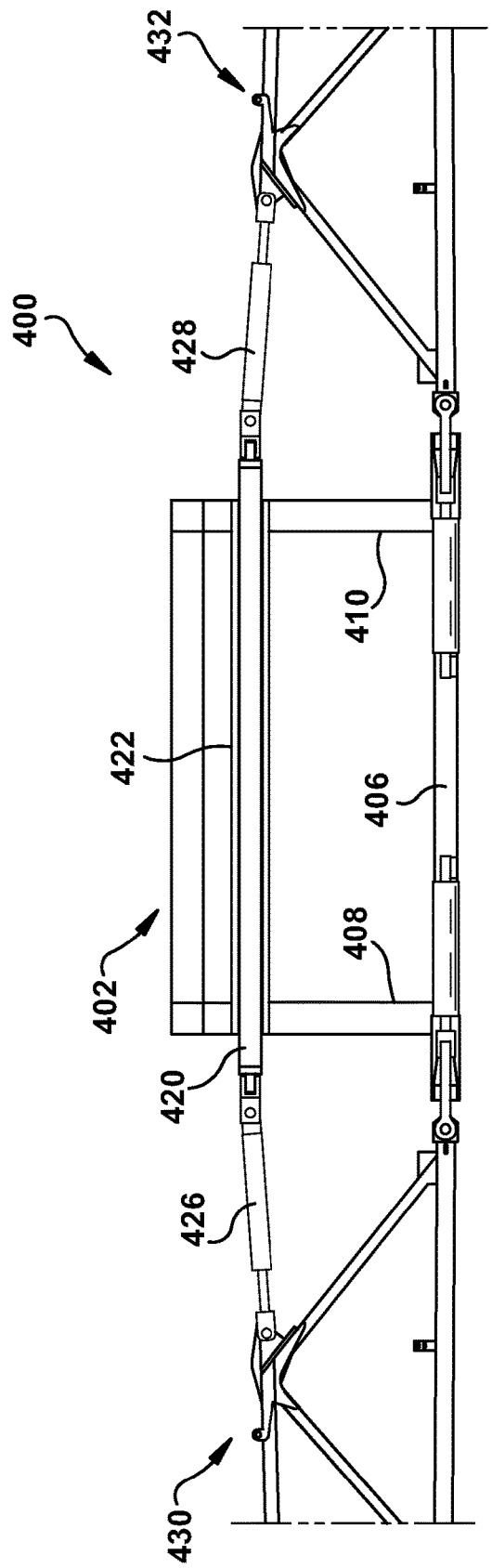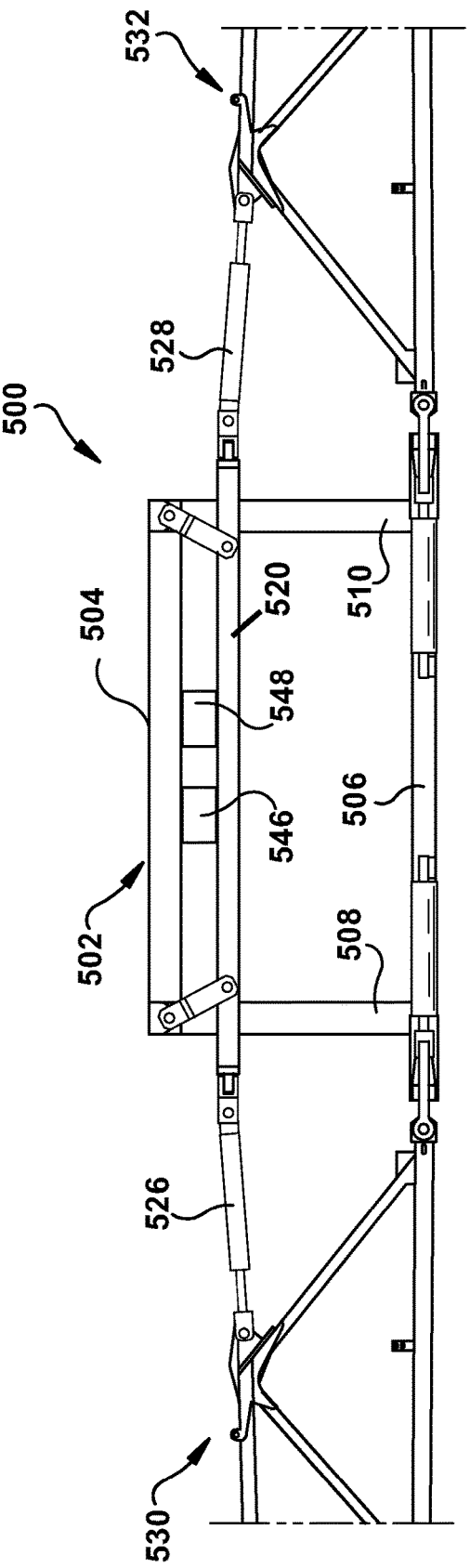

BOOM ROLL LINKAGE

BACKGROUND

Agricultural sprayers are used to apply desired substances to crops or soil. Sprayers are typically attached to a vehicle, whether self-moving or coupled with a separate vehicle, to be moved through fields during application. Often, the sprayers have boom wings that are cantilevered out from a central frame so that the sprayer can travel over crops without damaging the crops, and larger areas can be covered with each pass. However, when traveling over uneven terrain the associate vehicle may roll from side to side, resulting in roll of the boom wings. This roll can cause the distance between the boom wings and the target crops to change, which may result in undesired application or damage.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for stabilizing cantilevered booms that are coupled to a vehicle. For example, the vehicle may be traveling over uneven terrain, which can cause the vehicle to roll to the left and right. In this example, the vehicle roll can result in the respective booms to roll up and down relative to the ground, which may result in the booms contacting the ground or damaging crops. In one implementation, a stabilizing suspension can be used to mitigate the roll of the booms by isolating the vehicle roll from the roll of the booms.

In one implementation of a boom suspension system for level suspending associated left and right booms from an associated vehicle, a central frame can be operably, fixedly engaged with a chassis of the associated vehicle, where the central frame comprises a top member and a bottom member. Further, the system can comprise a horizontally disposed stabilizer bar that comprises a left end and a right end. In this implementation, the left end can be engaged with a left boom tilt cylinder that is operably engaged with a top frame of a left boom, and the right end can be engaged with a right boom tilt cylinder that is operably engaged with a top frame of a right boom. Additionally, a stabilizer bar link can be engaged with the central frame and with the stabilizer bar. The link can allows the stabilizer bar to move left and right with respect to, and independently from, the central frame, while the stabilizer bar remains operably engaged with the central frame through the stabilizer bar link. A left wing pivot joint can be operably engaged with the left boom at a left bottom frame and a left end of the bottom member. A right wing pivot joint can be operably engaged with the right boom at a right bottom frame and a right end of the bottom member. Respective wing pivot joints comprising a roll pivot to provide for the engaged boom to pivot up and down relative to the central frame.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIGS. 2A and 2B are component diagrams illustrating one implementation of one or more portion of one or more systems described herein.

FIG. 4 is a component diagram illustrating an alternate implementation of an example boom suspension system.

FIG. 5 is a component diagram illustrating one implementation of one or more portion of one or more systems described herein.

DETAILED DESCRIPTION

Figure 1:
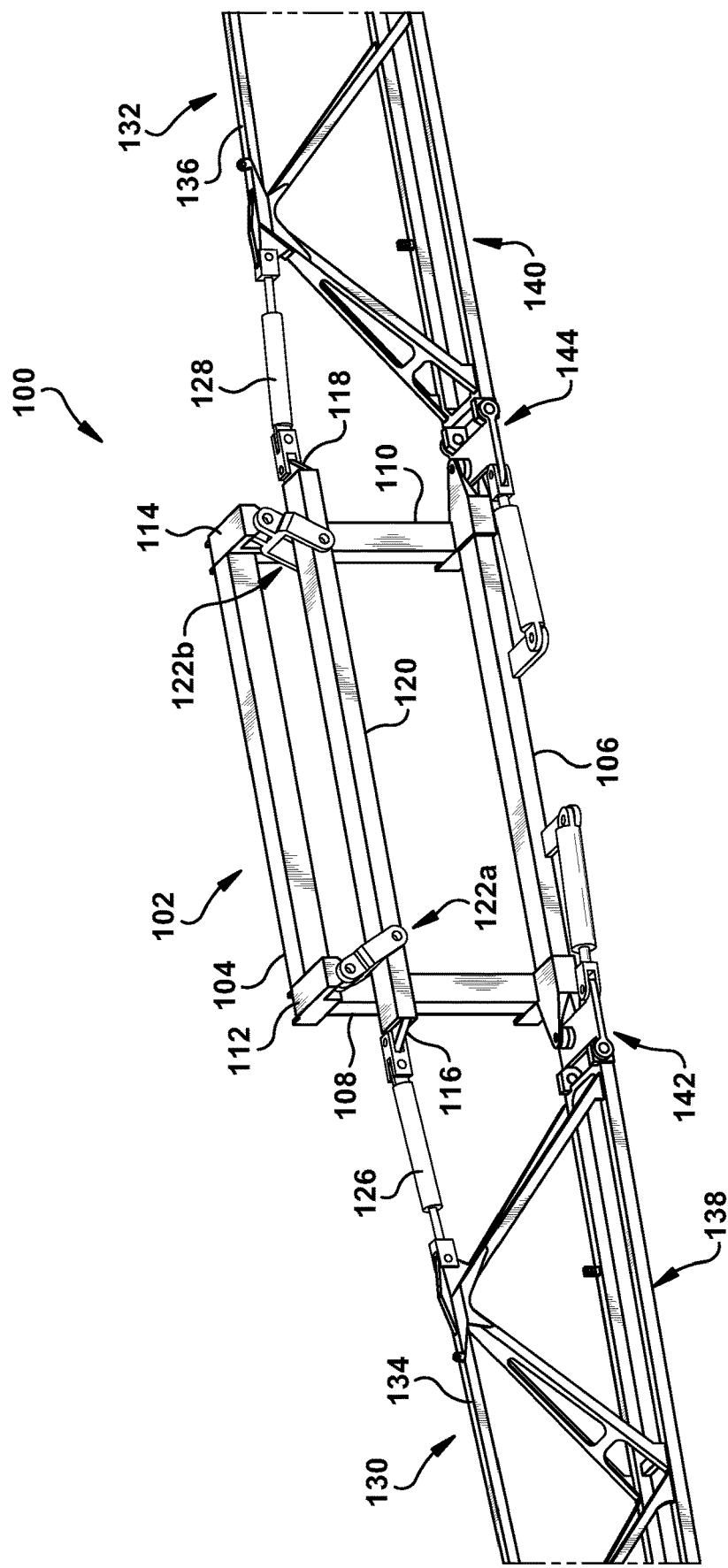
FIG. 1 is a component diagram illustrating one implementation of an example boom suspension system.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A boom suspension system may be devised that mitigates roll of cantilevered arms of a boom apparatus when the chassis of a vehicle engaged with the boom apparatus rolls to the side. That is, for example, a crop sprayer used in agricultural settings can be used to apply desired chemicals to soil or crops. The crop sprayer can be a self-propelled vehicle or may be attached to a separate vehicle to move the sprayer over target fields. A crop sprayer typically has cantilevered boom wings that deploy from either side of the sprayer, projecting a spraying width equivalent to the combined length of the cantilevered boom wings. In one implementation, the systems described herein may be used to help stabilize the cantilevered boom wings of a crop sprayer.

That is, for example, a vehicle traversing uneven terrain may experience roll from side to side. In this example, boom wings extending in a cantilevered manner from an apparatus coupled with the vehicle may experience roll, which can result in the ends of the wings striking the ground or objects protruding from the ground (e.g., crops). A boom suspension system described herein can mitigate wing roll, by providing for the wings to move independently from a frame that couples the suspension system to the chassis. Further, in this example, movement and inertia of the wings can assist in maintaining a relatively horizontal position even when the vehicle rolls from side to side. As one example, the boom apparatus can comprise an agricultural sprayer, which boom wings that extend to allow for greater spraying coverage. In this example, it is preferable to maintain the boom wings at a consistent distance from the ground or target crops during application. The boom suspension system described herein can mitigate up and down movement of the respective boom wings of the sprayer, to help maintain a consistent distance from the ground, while traveling over uneven ground.

FIGS. 1, 2A, 2B, and 3 are is a component diagrams illustrating an example boom suspension system 100, and various implementations. In this implementation the example system 100 comprises a central frame that is operably (e.g., during operation of the system), fixedly engaged with a vehicle chassis (e.g., 350 of FIG. 3). For example, the central frame may be fastened (e.g., or otherwise operably, fixedly engaged) to lift arms that are attached to the vehicle chassis, where the lift arms are used to lift and lower the central frame to a desired height. Further, in the example system 100, the central frame can comprise a top member 104 and a bottom member 106. In some implementations, the central frame can also comprise a left or first vertical member 108 and a second or right vertical member 110. The left vertical member 108 and right vertical member 110 can respectively be fixedly engaged with the top member 104 and the bottom member 106. In some implementations, the central frame 102 may comprise additional members, for example, depending on the amount of support needed, and/or the type of application. In some implementations, the top member can comprise a first or left end 112 and a second or right end 114.

As illustrated in FIG. 1, the example system 100 comprises a horizontally disposed stabilizer bar 120. The stabilizer bar 120 can a first or left end 116 and a second or right end 118. In this implementation, the left end 116 is engaged with a first or left boom tilt cylinder 126 that is operably engaged with a top frame 134 of a left boom 130. Further, the right end 118 is engaged with a second or right boom tilt cylinder 128 that is operably engaged with a top frame 136 of a right boom 132. That is, for example, the left boom 130 is coupled with the right boom 132 by the stabilizer bar 120, which is coupled to the left tilt cylinder 126 and right tilt cylinder 128, respectively engaged with the boom frames 134, 136. As an example, the respective left and right tilt cylinders 126, 128 can be used to independently pivot the attached boom 130, 132 up and down, vertically, to adjust the height from ground (e.g., or crop) of the boom wings 130, 132. The stabilizer bar can be of sufficient length to allow the respective booms 130, 132 to be operably disposed in a substantially horizontal position.

In this implementation, in the example system 100, a stabilizer bar link 122 that is engaged with the central frame 102, and is engaged with the stabilizer bar 120. The stabilizer bar link 122 allows the stabilizer bar 120 to move left and right (e.g., translate substantially horizontally) with respect to, and independently from, the central frame 102, while the stabilizer bar 120 is operably coupled with the central frame 102 through the stabilizer bar link 122. That is, for example, the stabilizer bar link 122 (a.k.a.: frame link) can hold the stabilizer bar 120 in alignment with the central frame, mitigating movement of the stabilizer bar 120 from front to back or laterally. In this way, for example, the stabilizer bar 120, and coupled booms 130, 132, can move side to side and remain substantially stable with regard to lateral or front to back movement.

Further, as illustrated in FIG. 1, the example system 100 can comprise a left wing pivot joint 142 that is operably engaged with the left boom 130 at a left bottom frame 138 and a left end of the bottom member 106. Additionally, a right wing pivot tilt 144 can be operably engaged with the right boom 132 at a right bottom frame 138 and a right end of the bottom member 106. In this implementation, the respective wing pivot tilts 142, 144 can comprise a roll pivot that provides for the engaged boom 130, 132 to pivot (e.g., roll) up and down. For example, the left and right booms 130, 132 are configured to pivot side to side or horizontally so that the booms 130, 132 can be stowed for transport. In this implementation, the roll pivot of the respective wing pivot tilts 142, 144 can also allow the respective booms 130, 132 to pivot up and down or vertically.

In one implementation, as illustrated in FIGS. 1, 2A and 2B, the stabilizer bar link 122 can comprise at least one swing link 122a, 122b that is pivotably engaged with the top member 104 or top portion or the central frame 120, and is pivotably engaged with the stabilizer bar 120. In one implementation, the length of the at least one swing link 122a, 122b can be determinative of a length of travel of the stabilizer bar left and right. That is, for example, as the length of the swing link increases, the distance of travel of the stabilizer bar 120 can also increase. In one implementation, the stabilizer bar link 122 can comprise a first swing link 122a engaged with a top portion of the central frame 120, at a left side 112 (e.g., left end) and a second swing link 122b engaged with the top portion of the central frame 120, at a right side 114 (e.g., right end). That is, the first swing link 122a can be engaged with the top member 104 proximate the left end 112, and the second swing link 122b engaged with the top member 104 proximate the right end 114. As illustrated, the respective swing links 122a, 122b are pivotably engaged with the top member 104 and pivotably engaged with the stabilizer bar 120 such that the pivotable engagements have parallel axes. In this example, this arrangement allows the stabilizer bar 120 to travel left and right horizontally independently of the central frame 102, while mitigating movement laterally or front to back.

Figure 3:
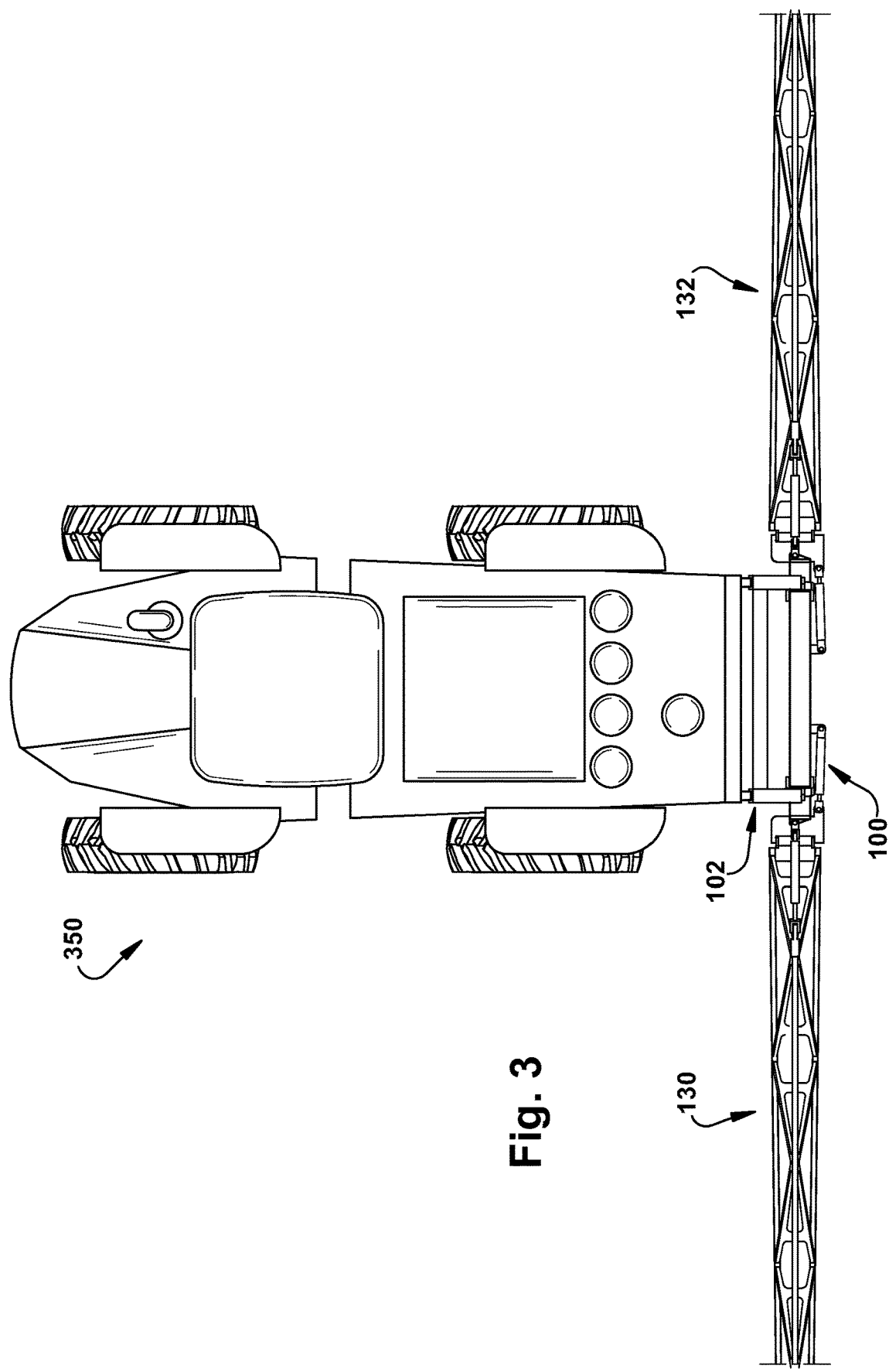
FIG. 3 is a component diagram illustrating one implementation of one or more portion of one or more systems described herein.

In one implementation, as illustrated in FIGS. 1-3, the distance between the first swing link engagement with the top member 104 and the second swing link engagement with the top member 104 is greater than a distance between the first swing link engagement with the stabilizer bar 120 and the second swing link engagement with the stabilizer bar 120. As an example, this arrangement would dispose the respective swing links 122a, 122b angling down toward the center of the central frame 102 (e.g., as illustrated). In an alternate implementation, the distance between the first swing link engagement with the top member 104 and the second swing link engagement with the top member 104 is less than a distance between the first swing link engagement with the stabilizer bar 120 and the second swing link engagement with the stabilizer bar 120. In this implementation, for example, the respective swing links 122a, 122b may be angling down away from the center of the central frame 102. In yet another alternate implementation, a distance between the first swing link engagement with the top member 120 and the second swing link engagement with the top member 120 can be substantially equivalent to a distance between the first swing link engagement with the stabilizer bar 120 and the second swing link engagement with the stabilizer bar 120. In this implementation, for example, the respective swing links 122a, 122b may be substantially vertical and parallel to each other when no roll is applied.

FIGS. 2A and 2B, along with FIG. 3, are component diagrams that illustrate the example system 100 in one example operation. FIG. 2A shows the example system 100 is a neutral or horizontal position, where the stabilizer bar 120 is parallel and substantially centered with respect to the central frame 102. That is, for example, the respective booms 130, 132, to which the stabilizer bar 120 is coupled, are in a neutral or horizontal position, such as when the vehicle chassis (e.g., 350 of FIG. 3) is disposed on substantially flat and level ground.

FIG. 2B illustrates the example system when the vehicle chassis 350, as in FIG. 3, undergoes roll, such as when the vehicle encounters uneven terrain. In this example, because the central frame 102 is fixedly engaged with the vehicle chassis 350, the central frame also experiences roll or roll to a same side as the roll of the vehicle. However, because the left and right horizontal movement of the stabilizer bar 120 is independent from the roll of the central frame 102, the stabilizer bar 120 may not undergo the same amount of horizontal movement. That is, in this example, the inertia of the left boom 130 can be applied to the coupled stabilizer bar 120 when the central frame 102 undergoes roll. In this example, because the left boom 130 was in a neutral, rest position in FIG. 2A, the resting inertia of the left boom 130 can maintain the stabilizer bar in a substantially neutral position with respect to the right boom 132. However, as illustrated, the position of the stabilizer bar 120 is changed with respect to the central frame 102, as the central frame has rolled to the right, while the stabilizer bar 120 remains substantially neutral. That is, for example, the stabilizer bar 120 has moved to the left horizontally with respect to the central frame 102. Upon the central frame returning to a neutral position, as in FIG. 2A, the stabilizer bar 120, and thus the coupled booms 130, 132, can return to the neutral position relative to the central frame 102 (e.g., and the vehicle chassis 350). In this way, the respective booms 130, 132 can remain substantially horizontal while the central frame rolls from side to side, for example.

In alternate implementations, as illustrated in FIG. 4, the stabilizer bar link 422 can comprise a sleeve or rail. In one example implementation, the stabilizer bar link 422 can comprise a sleeve that is operably, fixedly engaged with the central frame 404, and is also slidably engaged with the stabilizer bar 420. In this implementation, the stabilizer bar 420 can translate left and right, horizontally, inside the sleeve 422. In an alternate implantation, the stabilizer bar link 422 can comprise a rail that is fixedly engaged with the central frame 420. In this implementation, the rail of the stabilizer bar link 422 can be slidably engaged with the stabilizer bar 420 such that the stabilizer bar can translate left and right, horizontally, along the rail. As illustrated, the stabilizer bar 420 is engaged with the left or first tilt cylinder 426, which is engaged with the left or first boom 430. Further, the stabilizer bar 420 is engaged with the right or second tilt cylinder 428, which is engaged with the right or second boom 432.

In one implementation, the stabilizer bar link 422, as a sleeve or rail, can be fixed to the respective left and right vertical members 408, 410 of the central frame. In another implementation, the stabilizer bar link 422, as a sleeve or rail, can be fixed to the top member 404 of the central frame. Additionally, as illustrated, the bottom member or the central frame 402 can be pivotably engaged with the first and second booms 430, 432, such as by a pivot roll (e.g., 142, 144 of FIG. 1). It should be appreciated that it is anticipated that those skilled in the art may devise alternate means for coupling the stabilizer bar to the central frame 402 to mitigate movement of the stabilizer bar laterally or front to back, while allowing the stabilizer bar to translate horizontally left and right. It should be noted that the coupling of the left and right booms 430, 432 using the stabilizer bar 420 allows for horizontal movement of the respective booms 430, 432 independently from the central frame 420 (e.g., an thus the fixedly engaged vehicle chassis 350, FIG. 3).

In one implementation, as illustrated in FIG. 5, the example system 500 can comprise a force damper 546. The force damper 546 can be engaged with the stabilizer bar 520 to dampen left and right horizontal movement of the stabilizer bar 520. That is, for example, as the vehicle chassis rolls from side to side, such as over uneven terrain, the resulting roll of the respective booms 530, 532 can produce an oscillating effect back and forth for the stabilizing bar 520 (e.g., and up and down for the respective booms 530, 532). In this implementation, the force damper 546 can mitigate the oscillating effect, and help stabilize the roll of the respective booms 530, 532. As an example, the damper can be engaged with the stabilizer bar 520 and the central frame 502, at a location (e.g., top, side, or bottom members 504, 508, 510, 506) that is chosen by sound engineering principles to produce the desired effect of dampening the oscillation of the stabilizer bare 520. Further, the force dampener, as an example, can comprise a shock absorber, electromagnetic damper, spring, or other suitable force damper, or any combination thereof.

In another implementation, the example system 500 can comprise a biasing component 548 that is engaged with the stabilizer bar 520 and the central frame 502 to bias the stabilizer bar 520 toward the center of the top member 504. That is, for example, the stabilizer bar 520 can be centered in a neutral position, which is substantially aligned with the center of the top member 504. For example, the biasing component 548 can urge the stabilizer bar to the centered neutral position when the roll of the respective booms 530, 532, created by the roll of the vehicle chassis, is lessened to a force less than a biasing force applied by the biasing component 548. In this way, for example, the stabilizer bar 520 can return to the neutral position, which allows the respectively attached booms 530, 532 (e.g., attached by the left and right tilt cylinders 526, 528) to return to a neutral position (e.g., horizontal and parallel to the ground).

Figure 6A:
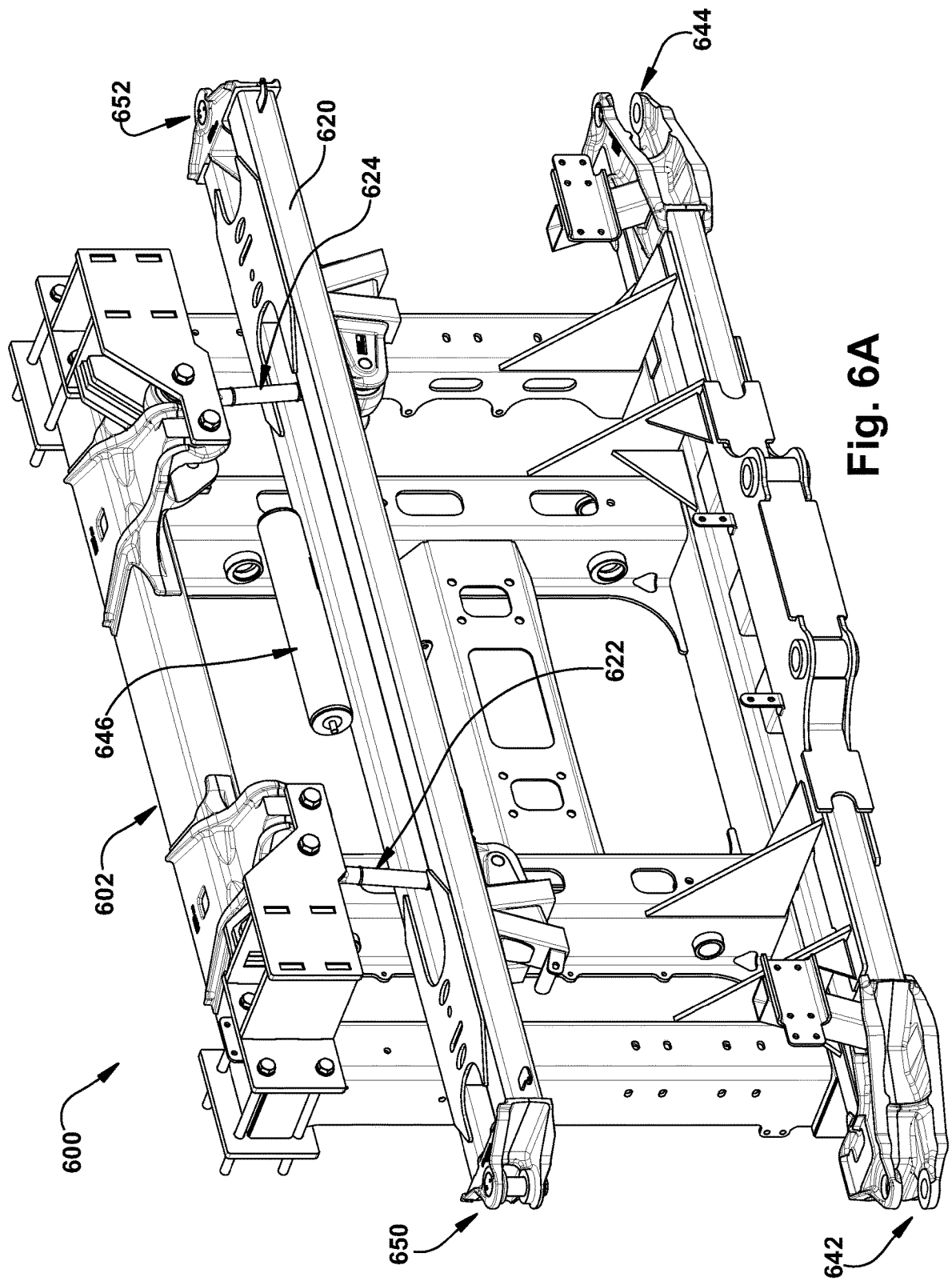
FIGS. 6A and 6B are component diagrams illustrating views of an example implementation of one or more portions of the system described herein.
Figure 6B:
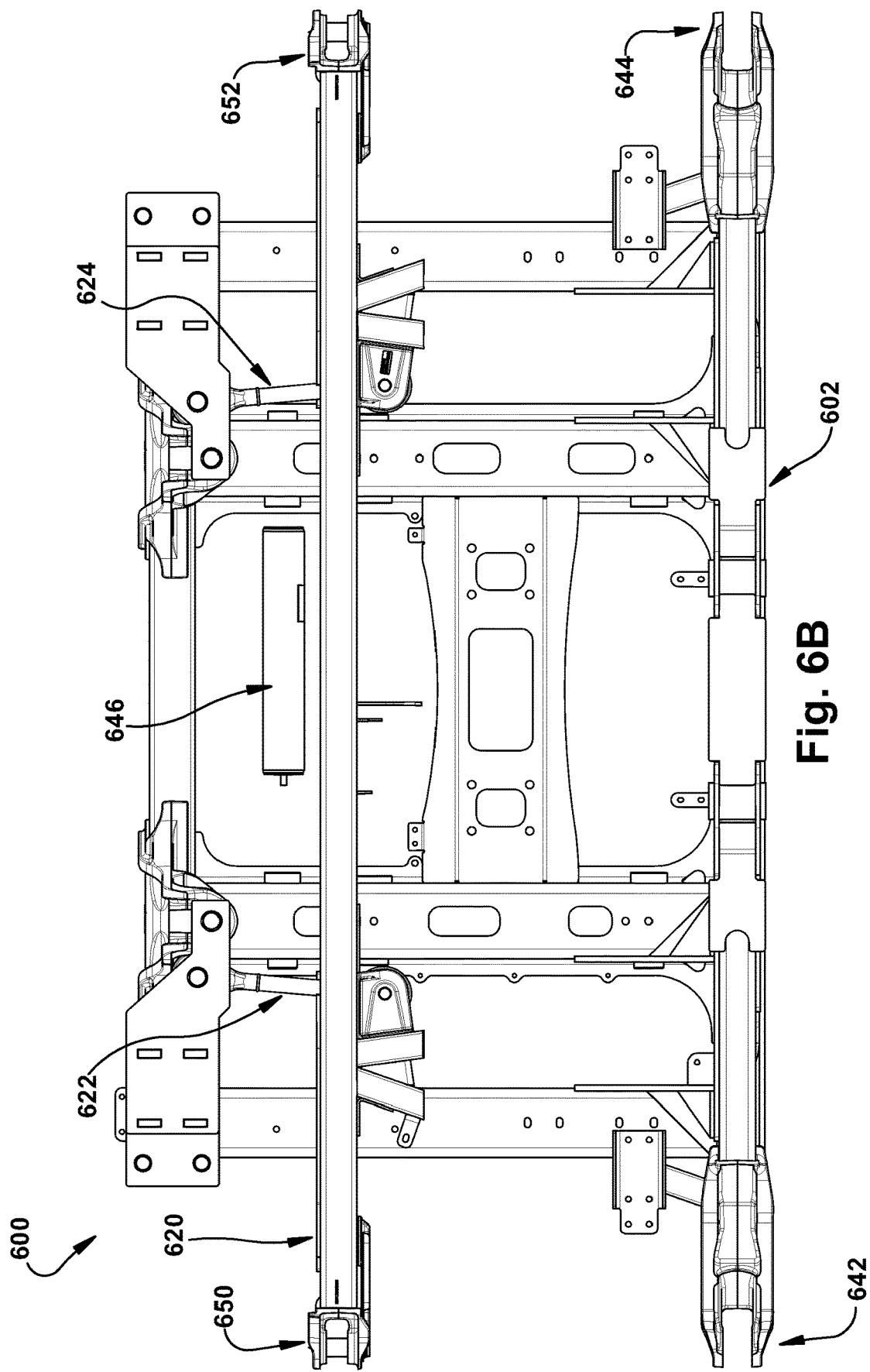

As one illustrative example, FIGS. 6A and 6B are component diagrams illustrating an example implementation of one or more portions of the systems 600 described herein. FIG. 6A is a perspective rear-top-side view of the example system 600; and FIG. 6B is a rear view of the example system 600. In this example, the fixed central frame 602 can be fixedly engaged with a chassis of a vehicle (e.g., at the rear of a self-propelled sprayer vehicle, a sprayer towed behind a tractor, etc., such as illustrated in FIG. 3). In this example, the central frame 602 can comprise a first/left lower fold pivot 642, and a second/right lower fold pivot 644. As described above, the respective left and right fold pivot 642, 644 can be pivotably coupled with a lower portion of a spray boom (e.g., left and right respectively). These pivots 642, 644, for example, can be used as folding pivots to allow the booms of the sprayer to fold back against the vehicle or implement, rotating in a yaw axis.

Further, the example system 600 can comprise a first/left stabilizer bar link 622, and a second/right stabilizer bar link 624. In this example, the respective bar links 622, 624 can be pivotably coupled with the central frame 602, such as at a top member. Respective bar links 622, 624 can further be pivotably linked with a stabilizer bar 620. The stabilizer bar 620 can be couple with or comprise a first/left upper fold pivot 650 and a second/right upper fold pivot 652. In one implementation, the respective upper fold pivot 650, 652 can be configured to be pivotably coupled with a top portion of a spray boom (e.g., left and right respectively). In one implementation, such as illustrated in FIGS. 1-2, the respective upper fold pivot 650, 652 can be coupled with left and right tilt cylinders, which may be coupled with the top portion of the spray boom. For example, the respective upper fold pivot 650, 652 can be used as folding pivots to allow the booms of the sprayer to fold back against the vehicle or implement, rotating in a yaw axis.

In one implementation, the example system 600 can comprise a damper component 646, such as a shock absorber or the like, coupled between the stabilizer bar 620 and the central frame 602. In this example, the damper component 646 can be configured to dampen a left and right movement of the stabilizer bar 620, such as when the coupled boom arms roll up and down when the chassis tilts to the left and right.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A boom suspension system for level suspending associated left and right booms from an associated vehicle, the system comprising:
    a central frame rigidly coupled to a chassis of the associated vehicle, the central frame comprising a top member and a bottom member;
    a horizontally disposed stabilizer bar comprising a left end and a right end, the left end being coupled to a top frame of a left boom via a left boom tilt cylinder, and the right end being coupled to a top frame of a right boom via a right boom tilt cylinder;
    a stabilizer bar link coupled to the central frame and the stabilizer bar, the stabilizer bar link being configured to allow the stabilizer bar to move left and right with respect to, and independently from, the central frame while the stabilizer bar remains operably engaged with the central frame through the stabilizer bar link; and
    a left wing pivot joint coupled to a left end of the bottom member of the central frame and to the left boom at a left bottom frame, and a right wing pivot joint coupled to a right end of the bottom member of the central frame and to the right boom at a right bottom frame, respective wing pivot joints comprising a roll pivot to provide for the respectively coupled boom to pivot up and down relative to the central frame.

2. The system of claim 1, the stabilizer bar link comprising at least one swing link pivotably engaged with the top member and pivotably engaged with the stabilizer bar, the length of the at least one swing link determinative of a length of travel of the stabilizer bar left and right.

3. The system of claim 2, the stabilizer bar link comprising a first swing link engaged with the top member at a left side and a second swing link engaged with the top member at a right side.

4. The system of claim 3, the first swing link engaged with the top member proximate the left end and the second swing link engaged with the top member proximate the right end.

5. The system of claim 3, wherein a distance between the first swing link engagement with the top member and the second swing link engagement with the top member is one of:
    less than a distance between the first swing link engagement with the stabilizer bar and the second swing link engagement with the stabilizer bar; or
    greater than the distance between the first swing link engagement with the stabilizer bar and the second swing link engagement with the stabilizer bar.

6. The system of claim 3, wherein a distance between the first swing link engagement with the top member and the second swing link engagement with the top member is substantially equivalent to a distance between the first swing link engagement with the stabilizer bar and the second swing link engagement with the stabilizer bar.

7. The system of claim 1, the stabilizer bar link comprising a rail, fixedly engaged with the central frame, and slidably engaged with the stabilizer bar such that the stabilizer bar can translate left and right along the rail.

8. The system of claim 1, comprising a force damper engaged with the stabilizer bar to dampen left and right movement of the stabilizer bar.

9. The system of claim 1, comprising a biasing component engaged with the stabilizer bar and the central frame to bias the stabilizer bar toward the center of the top member.

10. The system of claim 1, the central frame comprising a left vertical member and a right vertical member respectively fixedly engaged with the top member and the bottom member.

11. The system of claim 1, the stabilizer bar link comprising a sleeve operably, fixedly engaged with the central frame, and slidably engaged with the stabilizer bar such that the stabilizer bar can translate left and right inside the sleeve.

12. A boom suspension that provides for engaged booms to move independently from a central frame that is rigidly coupled to a chassis of a vehicle and supports the boom suspension, comprising:
 a stabilizer bar comprising a first end and a second end, the first end of the stabilizer bar being coupled to a top frame of a first boom via a first tilt cylinder and the second end of the stabilizer bar being coupled to a top frame of a second boom via a second tilt cylinder;
 a stabilizer bar link coupled to the stabilizer bar and the central frame, the stabilizer bar link configured to allow the stabilizer bar to translate horizontally independently from the central frame; and
 a first pivot joint coupling a first end of a bottom member of the central frame to a bottom frame of the first boom, and a second pivot joint coupling a second end of the bottom member of the central frame to a bottom frame of the second boom, the first and second pivot joints allowing the respective booms to pivot vertically relative to the central frame.

13. The suspension of claim 12, the stabilizer bar of sufficient length to allow the respective booms to be operably disposed in a substantially horizontal position.

14. The suspension of claim 12, the stabilizer bar link comprising at least one swing link pivotably engaged with a top portion of the central frame, and pivotably engaged with the stabilizer bar, the length of the at least one swing link determinative of a length of horizontal translation of the stabilizer bar.

15. The suspension of claim 14, the stabilizer bar link comprising:
 a first swing link engaged with a first side of the top portion of the central frame and the first end of the stabilizer bar; and
 a second swing link engaged with a second side of the top portion of the central frame and the second end of the stabilizer bar.

16. The suspension of claim 15, wherein a distance between the first swing link engagement with the central frame and the second swing link engagement with the central frame is one of:
 less than a distance between the first swing link engagement with the stabilizer bar and the second swing link engagement with the stabilizer bar; or
 greater than the distance between the first swing link engagement with the stabilizer bar and the second swing link engagement with the stabilizer bar.

17. The suspension of claim 12, the stabilizer bar link comprising a sleeve operably, fixedly engaged with a top portion of the central frame, and slidably engaged with the stabilizer bar such that the stabilizer bar can translate horizontally inside the sleeve.

18. The suspension of claim 12, the stabilizer bar link comprising a rail, fixedly engaged with a top portion of the central frame, and slidably engaged with the stabilizer bar such that the stabilizer bar can translate horizontally along the rail.

19. The suspension of claim 12, comprising a force damper engaged with the stabilizer bar and central frame to dampen horizontal translation of the stabilizer bar.

20. The suspension of claim 12, comprising a biasing component engaged with the stabilizer bar and the central frame to bias the stabilizer bar toward the center of the central frame.

* * * * *